United States Patent [19]

Yamano et al.

[11] Patent Number: 4,635,491
[45] Date of Patent: Jan. 13, 1987

[54] FAIL-SAFE MOTOR-DRIVEN CYLINDER FOR LIFTING APPARATUS

[75] Inventors: Kenji Yamano; Tetsuo Tamamura, both of Yokkaichi, Japan

[73] Assignee: Fuji Electric Co., Ltd., Kawasaki, Japan

[21] Appl. No.: 638,395

[22] Filed: Aug. 7, 1984

[30] Foreign Application Priority Data

Aug. 10, 1983 [JP] Japan .................. 58-147217

[51] Int. Cl.[4] .................................. F16H 57/10
[52] U.S. Cl. .................. 74/89.15; 74/411.5; 74/412 TA; 254/274; 254/378; 187/8.49; 187/24
[58] Field of Search ............ 74/89.15, 411.5, 412 TA; 182/231, 236; 187/8.47, 8.49, 24, 25, 77, 78; 254/274, 378

[56] References Cited

U.S. PATENT DOCUMENTS

| | | | |
|---|---|---|---|
| 263,773 | 9/1882 | Edson et al. | 187/77 |
| 1,522,967 | 1/1925 | Meyer et al. | 187/24 |
| 2,564,267 | 8/1951 | Manke | 187/8.49 |
| 3,291,260 | 12/1966 | Woor et al. | 187/8.47 |
| 3,403,570 | 10/1968 | Larson et al. | 74/411.5 |
| 3,435,915 | 4/1969 | Villars | 187/8.47 |
| 3,449,978 | 6/1969 | Stimpson | 74/411.5 |
| 3,543,598 | 12/1970 | Lanzenberger | 74/411.5 |
| 3,559,499 | 2/1971 | Profet | 74/411.5 |
| 4,022,428 | 5/1977 | Mantha | 187/8.47 |
| 4,158,797 | 6/1979 | Alcott | 254/356 |
| 4,295,384 | 10/1981 | Brandt et al. | 74/89.15 |
| 4,493,479 | 1/1985 | Clark | 254/274 |
| 4,518,153 | 5/1985 | West et al. | 254/274 |

FOREIGN PATENT DOCUMENTS

| | | | |
|---|---|---|---|
| 20825 | 1/1981 | European Pat. Off. | |
| 42801 | 12/1981 | European Pat. Off. | |
| 560559 | 7/1923 | France | 187/8.47 |
| 141946 | 11/1979 | Japan | 74/411.5 |
| 906663 | 2/1982 | U.S.S.R. | 74/411.5 |

Primary Examiner—Lawrence Staab
Attorney, Agent, or Firm—Bruce L. Birchard

[57] ABSTRACT

A motor-driven cylinder for lifting apparatus has screw means including intermeshed internally and externally threaded screw means by which a load can be moved upwardly and downwardly by the torque of a motor, the motor-driven cylinder including torque transmission means movable in a first direction and a second direction opposite thereto for transmitting the torque of the motor to the screw means. During operation, the torque transmission means is moved in the first direction by the applied torque of the motor causing compression of a spring. When no torque is produced from the motor due to its malfunctioning or due to a lack of electrical power applied to the motor the torque transmission means is moved in the second direction under the restoring force of the compressed spring into a mechanically braked condition. Thus, a compact, integral, low-cost safety device is provided for preventing the lifting apparatus from falling, accidentally, under the force of gravity.

7 Claims, 3 Drawing Figures

FAIL-SAFE MOTOR-DRIVEN CYLINDER FOR LIFTING APPARATUS

BACKGROUND OF THE INVENTION

1. Field of the Invention

This invention relates to motor driven cylinders for use as prime movers and more particularly to such cylinders as utilized in lifting apparatus, or the like.

2. Prior Art

Motor-driven cylinders have, for many years, been utilized in lifting apparatus, for example tables for lifting heavy loads or in elevators. It is apparent that, should the motor-driven cylinder fail, it would be dangerous to the load being lifted, for example to the occupants of an elevator. Thus, all such systems have been equipped with safety devices to prevent the object being lifted from falling under the force of gravity when the lifting apparatus fails, for any reason. It has been the practice, in the past, to have the safety equipment separate from the drive cylinder itself. Such an arrangement has made the lifting apparatus costly and unnecessarily large in size. One such safety device involves externally and internally threaded and cooperating propulsion screws, coupled to the motor drive, those propulsion screws being such that they can be automatically stopped. For example if the braking system on the drive motor fails to operate or the drive motor fails to produce normal torque, the vertical movement of the lifting apparatus is automatically stopped by the load in the direction of propulsion to achieve the desired safety. However, the screws which will automatically be stopped when the motor fails to produce adequate torque, have a low efficiency of about 30%, requiring under normal operation, a drive motor output that is three times that of an ordinary drive motor. Because the screws suffer an increased frictional loss, they are subjected to a high temperature rise and cannot be used frequently. The increased output required of the drive motor makes the apparatus unduly large in size and unnecessarily expensive.

Therefore it is an object of this invention to provide an improved motor-driven cylinder with inherent fail-safe capabilities.

It is a further object of this invention to provide, for lifting apparatus, a motor-driven cylinder which is of minimum size and expense and still exhibits the safety features required for safe use of the motor-driven cylinder.

SUMMARY OF THE INVENTION

According to this invention, a motor-driven cylinder for lifting apparatus has screw means, including internally and externally threaded screws, by means of which a load can be moved upwardly and downwardly by the torque of a motor, the motor-driven cylinder including torque transmission means movable in a first direction and in a second direction opposite to said first direction for transmitting the torque of the motor to the screw means. During operation, the torque transmission means is moved in the first direction by the torque of the motor. When no torque is produced by the motor due to its malfunctioning, the torque is produced by the motor due to its second direction under the urging of a spring so as to cause braking of the transmission means. By this means the lifting apparatus being driven by the motor-driven cylinder is prevented from falling under the force of gravity if and when the motor driving the cylinder ceases to operate properly.

BRIEF DESCRIPTION OF THE DRAWINGS

This invention and its mode of operation can best be understood by the description which follows taken in conjunction with the drawings, in which.

DETAILED DESCRIPTION OF THE PREFERRED EMBODIMENTS

Figure 1:
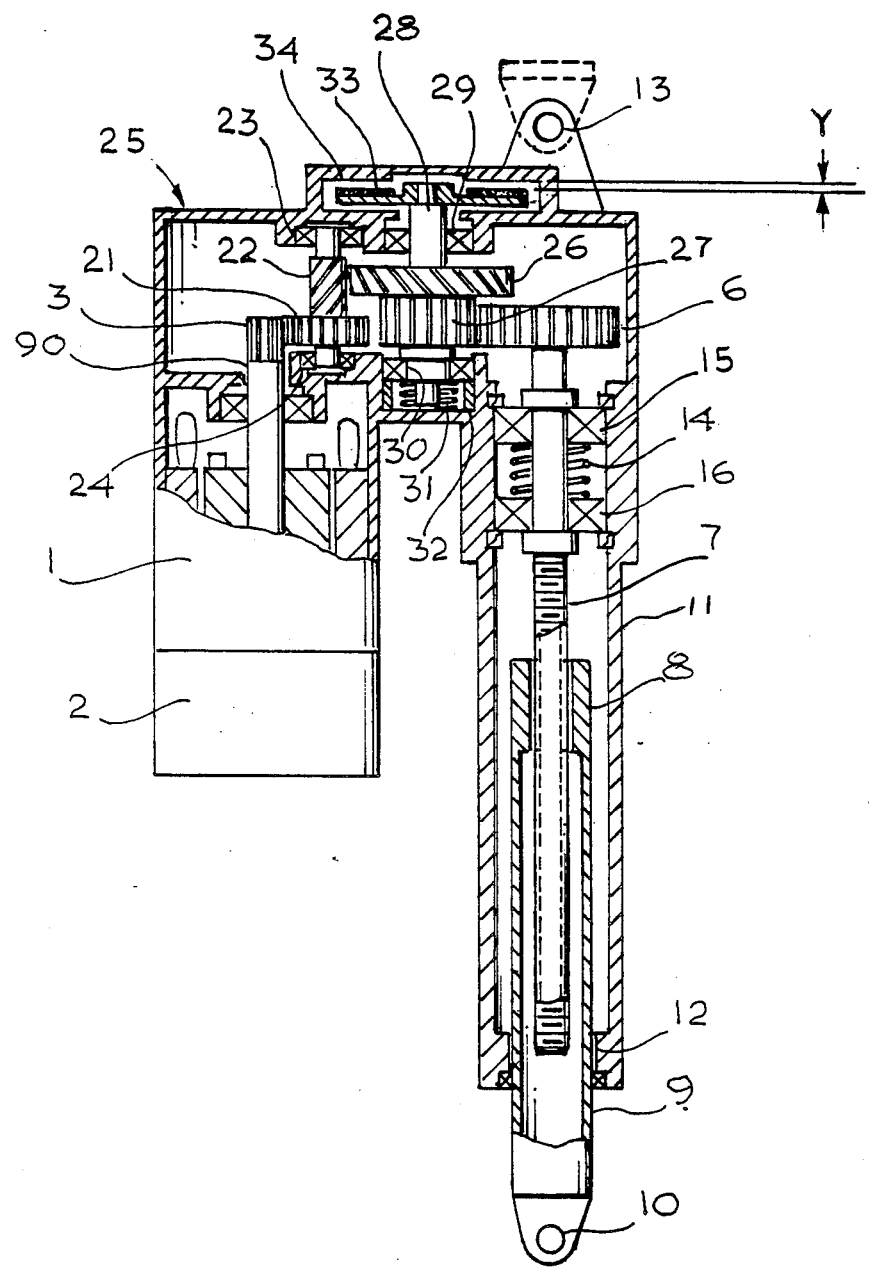
FIG. 1 is a front elevational view, partially in section, of a first embodiment of a motor-driven cylinder, according to the present invention.

As shown in FIG. 1, a gear 21, held in meshing engagement with a gear 3 on the shaft 90 of a drive motor 1 and a helical gear 22, which is coaxial with gear 21, are rotatably supported by bearings 23, 24 in a cylindrical frame 25. A helical gear 26 is in meshing engagement with helical gear 22. The helical gear 26 and a spur gear 27 coaxial therewith have a common shaft 28 rotatably supported by bearings 29, 30 in the cylindrical frame 25. A spur gear 6 is in meshing engagement with the spur gear 27, and an externally threaded propulsion gear 7 is coupled coaxially to the spur gear 6.

The bearings 29, 30 are axially-movably fitted in the cylindrical frame 25. A spring 31 is interposed between the lower bearing 30 and the cylindrical frame 25 in a coaxial relation to the shaft 28 for normally urging the shaft 28 upwardly. A collar 32 is also interposed between the lower bearing 30 and the cylinder frame 25 in coaxial relation to the shaft 28 to prevent the bearing 30 from being moved downwardly into contact with the cylindrical frame 25.

The helical gears 22, 26 have helical gear teeth inclined in a direction to produce a force tending to depress the shaft 28 while the drive motor 1 is energized to lift an object on, or in, the lifting apparatus. The axial downward component of such a force is large enough to compress spring 31 to an extent limited by the collar 32. During lifting and lowering operations, the shaft 28 is prevented by the collar 32 from moving excessively downwardly.

At the upper end of the shaft 28, there is coaxially affixed a rotatable brake disk 33 which can be pressed against a fixed brake surface 34 on the frame 25. When the rotatable brake disk 33 is pressed against the fixed brake surface 34 on upward movement of the shaft 28 under the restoring force of the spring 31, the spur gear 27 is braked to stop rotation of the externally threaded propulsion screw 7 coaxially coupled to the spur gear 27 through spur gear 6.

At the same time that the drive motor 1 is energized, non-energized brake 2 connected directly to the drive motor 1 is energized to release the motor from being braked. Torque from the drive motor 1 is transmitted through gears 3, 21, 22, 26, 27 and 6 to the externally threaded propulsion screw 7. The externally threaded propulsion screw 7 and an internally threaded propulsion screw 8 in meshing engagement therewith convert the rotative power from the drive motor 1 into a propulsive force, which is transmitted to a load (not shown) through a propulsion rod 9 contiguous with and affixed to or integral with the internally threaded propulsion screw 8. A propulsion coupling 10 serves to transmit the propulsive force and prevent the internally threaded propulsion screw 8 from being turned about its own axis, and also acts to prevent the generation of a bending moment between the motor-driven cylinder and the load system. The propulsion rod 9 is slidably supported by a cylinder bearing 12 mounted in an end of the cylindrical member 11. The cylindrical member 11 has an upper portion connected to a non-illustrated fixed member by a clevis 13.

When an object is to be lifted, the drive motor 1 of the motor-driven cylinder produces a torque and operates as a motor. When the object is to be lowered, the drive motor 1 operates as a generator to which a torque is transmitted from the load. When the vertical movement of the object is to be stopped, the drive motor 1 is de-energized and simultaneously the energized brake 2 is also de-energized to brake the drive motor 1. No torque is then produced by or imposed on the drive motor 1, and the speed of rotation thereof is progressively reduced by the braking torque from the de-energized brake 2 until it reaches zero to stop the drive motor 1.

A damping spring 14 is interposed coaxially with the externally threaded propulsion screw 7 between two bearings 15, 16 by which the externally threaded propulsion screw 7 is rotatably supported in the cylindrical member 11. The damping spring 14 is compressed under a force greater than the force from the load, so that when the load is moved vertically, the damping spring 14 is not compressed or expanded and the externally threaded propulsion screw 7 and the gear 6 coupled thereto remain positionally constant. When a control system malfunctions for some reasons, the propulsion rod 9 cannot be stopped in a desired position but continues to move upwardly into abutting engagement with the bearing 16 thereby compressing the damping spring 14. As a result, the rotative energy generated by the motor 1 and applied as the propulsive force to the propulsion rod 9 through the externally threaded propulsion screw 7 is converted into compression of the damping spring 14. No excessive collision energy is therefore generated in the drive cylinder which will be prevented from being damaged.

Operation of the motor-driven cylinder according to this invention is as follows:

When a load is to be lifted, motor 1 is turned on tending to produce rotation of shaft 90. Torque from the motor 1 is transmitted through the gears 3, 21, 22, 26, 27 and 6 to the externally threaded propulsion screw 7 which lifts an internally threaded propulsion screw 8. The load (not shown) connected to a propulsion coupling 10 integral with the internally threaded propulsion screw 8 is thus moved upwardly. At this time, the shaft 28 is depressed to the position limited by the collar 32 under the downward component force produced by the helical gears 22, 26, thus compressing the spring 31. The rotatable brake disk 33 is now spaced a distance "y" from the fixed brake surface 34.

When the load is to be lowered, the internally threaded propulsion screw 8 tends to move downwardly under the gravitational force acting on the load. The externally threaded propulsion screw 7 is driven to rotate about its own axis, and the resultant torque is transmitted through the gears 6, 27, 26, 21 and 3 and through shaft 90 to the motor 1, which now operates as a generator operating into an electrical load (not shown) allowing the mechanical load to be lowered while producing a braking torque. At this time, the shaft 28 is also depressed under the downward component force produced by the helical gears 22, 26, and the rotatable brake disk 33 is spaced the distance "y" from the fixed brake surface 34. For stopping the vertical movement of the load, energized brake 2, coupled to motor 1, is de-energized and it brakes the motor 1 mechanically to stop the load in a desired position.

If the motor 1 and the brake 2 are subjected to any abnormal condition during the vertical movement of the load, thus failing to produce a reactive force corresponding to the force of the load, the helical gears 22, 26 no longer generate a force tending to lower the shaft 28, since no drive torque or no braking torque is produced by the motor 1. Under those conditions, the spring 31 releases its restoring force and pushes the shaft 28 upwardly. Stated otherwise, the spring 31 exerts restoring force until the gap "y" is eliminated, whereupon the rotatable brake disk 33 is forcibly held and remains pressed against the fixed brake surface 34 under the restoring force of the spring 31. As a result, the shaft 28 is abruptly braked against rotation and remains stopped to prevent the load from falling by force of gravity. To further clarify how this novel safety feature works, if the circuit to motor 1, or motor 1, itself, fails and motor 1 thus looks like an open electrical circuit, or if motor 1 becomes de-coupled, mechanically, in any way from the torque chain made up of gears 3, 21, 22, 26, 27, 6, 7 and the internal threads of propulsion screw 8, it cannot act as a lifting force (because it is no longer effective as a motor) nor as a controlled lowering mechanism (because it is no longer effective as an electromagnetic brake) and the load will tend to fall with potentially disastrous results. However, since no torque forces are being transmited through the combination of helical gears 22, 26, the downward force produced during any transmission of torque through them (in either lowering or raising the load) disappears. The restoring force in spring 31 is then free to act and it urges bearing 30, shaft 28 and brake disk 33 upwardly until brake disk 33 engages fixed brake surface 34, stopping rotation of shaft 28, and rotation of gears 27, 6 and 7, thus preventing the extension of propulsion screw 8 and alos preventing falling of the load.

Figures 2, 3:
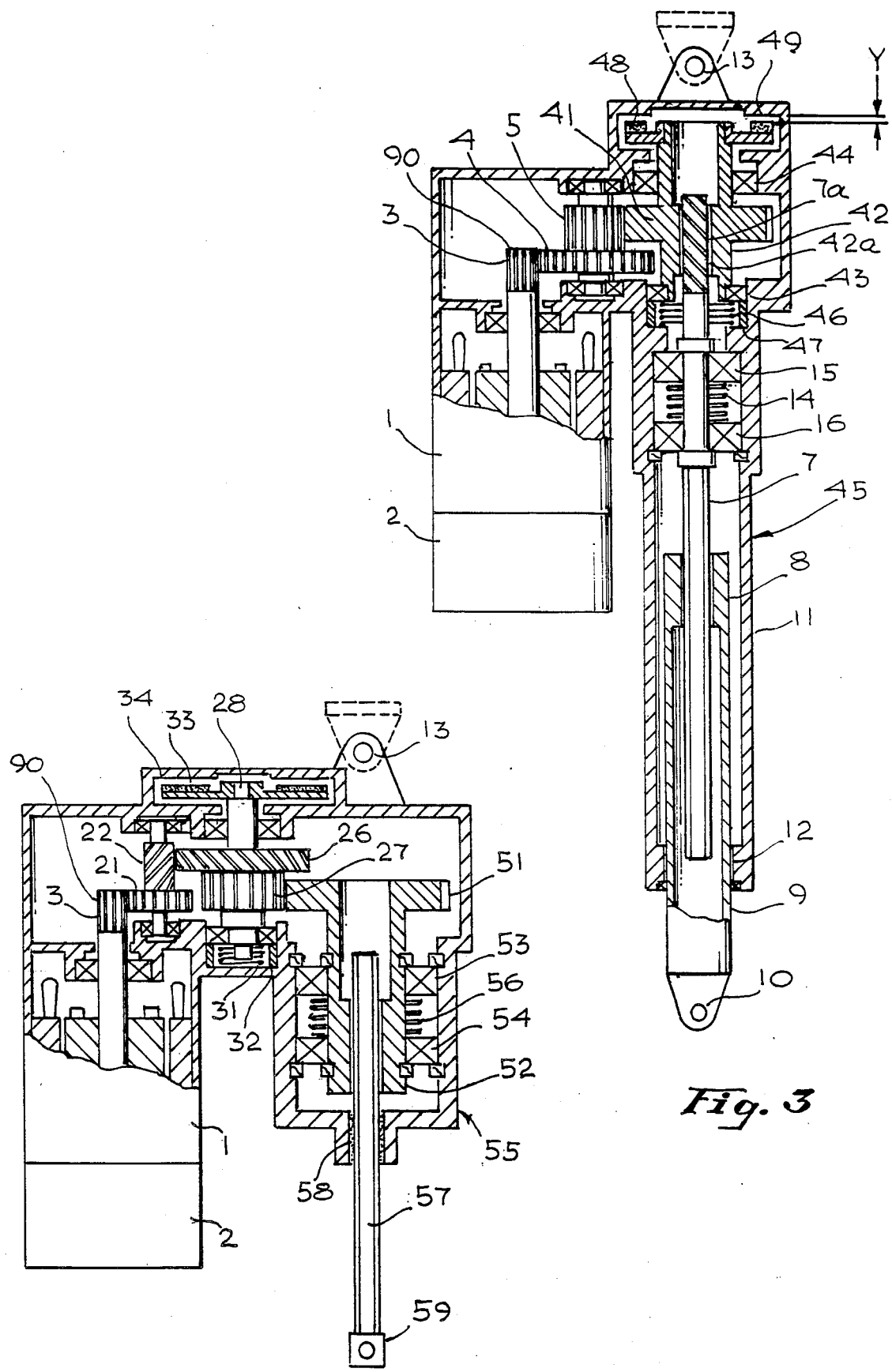
FIG. 2 is a front elevational view, partially in section, of a second embodiment of a motor-driven cylinder, according to the present invention; and, FIG. 3 is a front elevational view, partially in section, of a third embodiment of a motor-driven cylinder, according to the present invention.

FIG. 2 shows a motor-driven cylinder according to second embodiment of the present invention. This embodiment employs different externally and internally threaded propulsion screws than those of the first embodiment.

The shaft 28 can be pushed downwardly by the helical gears 22, 26, but is biased to move upwardly under the restoring force of the spring 31. A spur gear 51 is held in meshing relationship with the spur gear 27, which is on the shaft 28. Spur gear 51 is integral coaxially with an internally threaded propulsion screw 52 which is rotatably supported by bearings, 53, 54 in a frame 55. A damping spring 56 is interposed between the bearings 53, 54 in coaxial relation to the internally threaded propulsion screw 52. An externally threaded propulsion screw 57 held in meshing engagement with the internally threaded propulsion screw 52 is slidably supported by a cylinder bearing 58 in the frame 55. A propulsion coupling 59 is provided on the lower end of the externally threaded propulsion screw 57. A load (not shown) may be coupled to the propulsion coupling 59.

When it is desired to lift the load, the internally threaded propulsion screw 52 is driven into rotation about its own axis by the drive torque from the motor 1 transmitted from shaft 90 through the gears 3, 21, 22, 26, 27 and 51. Rotation of the internally threaded propulsion screw 52 causes the externally threaded propulsion screw 57 to be moved upwardly, thus lifting the load coupled to the propulsion coupling 59. For lowering the load, the internally threaded propulsion screw 52 is rotated by the lowering motion of the externally threaded propulsion screw 57, thereby driving the motor 1 through the gears 51, 27, 26, 22, 21 and 3 causing the motor 1, acting as a generator, to produce a braking torque due to the electrical energy generated thereby flowing into an electrical load (not shown). The mechanical load, therefore, moves downwardly.

The remaining details of construction and operation of the embodiment of FIG. 2 are the same as those embodiment of FIG. 1.

According to a third embodiment of the present invention, as shown in FIG. 3, the gear 4 is in meshing engagement with the gear 3 on the shaft of the motor 1, and a gear 41 meshes with gear 5. Gear 5 is contiguous, coaxially, with gear 4. A shaft 42 is integral with the gear 41 and rotatably supported from a frame 45 by upper and lower bearings 44, 43. The upper and lower bearings 44, 43 are mounted in the frame 45 for vertical sliding motion therein. A spring 46 is interposed between the lower bearing 43 and the frame 45 in coaxial relationship to the shaft 42 for normally biasing the shaft 42 upwardly A collar 47 is disposed between the lower bearing 43 and the frame 45 in coaxial relation to the shaft 42 for limiting downward compression of the spring 46.

A rotatable brake disk 48 is fixed to the upper end of shaft 42, coaxially therewith. The frame 45 has a fixed brake surface 49 against which the rotatable brake disk 48 can be pressed. When the shaft 42 is raised under the resilient force of the spring 46, the rotatable brake disk 48 is pressed against the fixed brake surface 49 to stop rotation of the shaft 42.

The shaft 42 has a coaxial, internally-threaded screw 42a in which is threaded an externally threaded upper screw portion 7a of externally threaded propulsion screw 7. The internally threaded screw 42a and the upper screw portion 7a have a helix angle such that the shaft 42 will be subjected to a downward force upon application thereto of torque from motor 1. The downward force on the shaft 42 is large enough to compress spring 46 to a degree limited by the collar 47.

The operation of the embodiment of FIG. 3 is as follows.

When lifting the load, torque from the motor 1 is transmitted via the gears 3, 4, 5 and 41 and the shaft 42 to the externally threaded propulsion screw 7 to raise the internally threaded propulsion screw 8. Thus, the load (not shown) coupled to the propulsion coupler 10 is lifted. Since there is no relative displacement between the shaft 42 and the externally threaded propulsion screw 7 at this time, the shaft 42 and the externally threaded propulsion screw 7 rotate in complete unison. The shaft 42 is depressed to a position limited by the collar 47, under a downward force generated by the threaded engagement between the internally threaded screw 42a and the externally threaded screw portion 7a, thus keeping the spring 46 in a compressed state. At this time, the rotatable brake disk 48 and the fixed brake surface 49 are spaced a distance "y" from each other.

When the load is lowered, the internally threaded propulsion screw 8 is lowered by reason of the gravitational force operating on the load (not shown) for rotating the externally threaded propulsion screw 7. The torque is transmitted through the shaft 42 and the gears 41, 5, 4 and 3 to the motor 1, which now operates as an electrically loaded generator to produce a braking torque while the load is being lowered. At this time, the shaft 42 is also displaced downwardly by reason of a downward force generated by the threaded engagement between the internally threaded screw 42a and the externally threaded screw portion 7a, thus keeping the spring 46 in a compressed condition. At this time, the rotatable brake disk 48 and the fixed brake surface 49 are also spaced a distance "y" from each other. For stopping the vertical movement of the load in the foregoing operation, a brake 2 is de-energized to brake the motor 1, mechanically. This braking action stops the load in the desired vertical position.

If the motor 1 and the brake 2 are subjected to any abnormal condition during the vertical movement of the load, thus failing to produce a reactive force corresponding to the force of the load, the shaft 42 no longer is subjected to a downward force since neither a driving torque nor a braking torque is produced by the motor 1. Therefore, the restoring force of spring 46 tends to push the shaft 42 upwardly. As a result, shaft 42 moves upwardly and rotates relative to the externally threaded propulsion screw 7, while rotating the shaft 90 of the motor 1, until the rotatable brake disk 48 is forcibly held against the fixed brake surface 49. As a result, the shaft 42 is abruptly braked against rotation and remains static to prevent the load from falling under the force of gravity.

While a particular embodiment of this invention has been shown and described, it will be apparent to those skilled in the art that variations and modifications may be made without departing from the true spirit and scope of this invention. It is the purpose of the appended claims to cover all such variations and modifications.

What is claimed is

1. For use with lifting apparatus, a motor-driven cylinder including:
   a motor supporting fixedly in said frame and having a rotatable shaft;
   screw means having intermeshed internally and externally threaded members;
   torque transmission means coupled between said rotatable shaft and said externally threaded member of said screw means;
   said torque transmission means including torque sensing means movable from a first position in the presence of torque transmission between said shaft and said screw means to a second position in the absence of torque transmission between said shaft and said screw means;
   braking means carried by said torque sensing means and operative upon the movement of said torque sensing means from said first position to said second position to move from a position in a first plane to a position in a second plane spaced from but parallel to said first plane thereby to prevent rotation of said internally threaded member in said screw means; and,
   load coupling means coupled to said screw means.

2. Apparatus according to claim 1 in which said torque transmission means includes a compression spring biasing said torque sensing means towards said second position.

3. Apparatus according to claim 1 in which, when said torque sensing means moves to said second position said braking means engages a portion of said frame.

4. Apparatus according to claim 1 in which said braking means carried by said torque sensing means is coaxial with said internally and externally threaded members of said screw means.

5. Apparatus according to claim 1 in which said braking means carried by said torque sensing means and said screw means lie along parallel but displaced axes.

6. For use with lifting apparatus, a motor-driven cylinder including:
   a frame;
   a motor supported fixedly in said frame and having a rotatable shaft;
   screw means having intermeshed internally and externally threaded members;
   torque transmission means coupled between said rotatable shaft and said externally threaded member of said screw means;
   said torque transmission means including torque sensing means movable from a first position in the presence of torque transmission between said shaft and said screw means to a second position in the absence of troque transmission between said shaft and said screw means;
   braking means carried by said torque sensing means and operative upon the movement of said torque sensing means to said second position to prevent rotation of said internally threaded member in said screw means; and,
   load coupling means coupled to said screw means;
   said torque sensing means including first and second intermeshed helical gears coupled between said rotatable shaft of said motor and said screw means, said first and second helical gears, when transmitting torque, producing a force in the direction of said first position of said torque sensing means.

7. For use with lifting apparatus, a motor-driven cylinder including:
   a frame;
   a motor supported fixedly in said frame and having a rotatable shaft;
   screw means having intermeshed internally and externally threaded members;
   torque transmission means coupled between said rotatable shaft and said externally threaded member of said screw means;
   said torque transmission means including torque sensing means movable from a first position in the presence of torque transmission between said shaft and said screw means to a second position in the absence of torque transmission between said shaft and said screw means;
   braking means carried by said torque sensing means and operative upon the movement of said torque sensing means to said second position to prevent rotation of said internally threaded member in said screw means; and,
   load coupling means coupled to said screw means;
   said torque sensing means including first and second intermeshed helical gears coupled between said rotatable shaft of said motor and said screw means.

* * * * *